United States Patent [19]

Schiller

[11] Patent Number: 5,235,435
[45] Date of Patent: Aug. 10, 1993

[54] METHOD OF PRODUCING HALFTONE IMAGES

[75] Inventor: Stephen N. Schiller, Menlo Park, Calif.

[73] Assignee: Adobe Systems Incorporated, Mountain View, Calif.

[21] Appl. No.: 846,754

[22] Filed: Mar. 4, 1992

Related U.S. Application Data

[63] Continuation of Ser. No. 434,924, Nov. 8, 1989, abandoned.

[51] Int. Cl.$^5$ .............................................. H04N 1/40
[52] U.S. Cl. ................................. 358/456; 340/793; 358/298; 358/455
[58] Field of Search ............... 358/456, 455, 459, 460, 358/457, 298; 340/793

[56] References Cited

U.S. PATENT DOCUMENTS

| | | | |
|---|---|---|---|
| 4,149,194 | 4/1979 | Holladay | 358/460 |
| 4,185,304 | 1/1980 | Holladay | 358/459 |
| 4,531,160 | 7/1985 | Ehn | 340/793 |
| 4,578,713 | 3/1986 | Tsao et al. | 358/298 |
| 4,615,013 | 9/1986 | Yan et al. | 358/104 |
| 4,700,235 | 10/1987 | Gall | 358/459 |
| 4,758,897 | 7/1988 | Hiratsuka et al. | 358/457 |
| 4,823,194 | 4/1989 | Mishima et al. | 358/455 |
| 4,897,736 | 1/1990 | Sugino | 358/457 |
| 4,903,123 | 2/1990 | Kawamura et al. | 358/456 |
| 4,926,267 | 5/1990 | Shu et al. | 358/456 |
| 4,930,023 | 5/1990 | Yakame | 358/457 |
| 4,972,500 | 11/1990 | Ishii et al. | 358/457 |
| 4,977,464 | 12/1990 | Ikuta | 358/457 |
| 4,985,779 | 1/1991 | Gall | 358/456 |

Primary Examiner—Edward L. Coles, Sr.
Assistant Examiner—Jill Jackson
Attorney, Agent, or Firm—Roger S. Borovoy

[57] ABSTRACT

An improved method is described for producing halftone images with halftone cell dimensions and orientation to match a desired screen grid by choosing reference halftone gray values for each pixel in a supertile of representative halftone cells, testing source pixel gray values against corresponding reference gray values and selectively displaying corresponding pixels, where the supertile includes more than one halftone cell, is composed of whole pixels, can tile the source image plane when placed side-by-side with copies of itself, and includes halftone cells on adjacent supertiles that, in tiling the plane, align exactly or closely to approximate a smooth halftone screen. The invention also includes ways of manipulating the supertile for faster output of a halftone image.

6 Claims, 12 Drawing Sheets

METHOD OF PRODUCING HALFTONE IMAGES

This is a continuation of application Ser. No. 07/434,924, filed Nov. 8, 1989, now abandoned.

FIELD OF THE INVENTION

This invention concerns the production of a halftone image formed with one or more rotated screens on a digital output device. In creating color separations the need arises for halftone screens at certain angles in order to prevent moiré effects. The screen angle and period (the distance of the regular spacing between the centers of halftone dots in the image) must be reproduced very accurately in order to avoid these moirés. The present invention is an improvement over the prior art in that more angle/period combinations are available and the method can be made to run quickly when implemented as a computer program. The classic screen system can be easily, and accurately, approximated by the method of the present invention.

BACKGROUND OF THE INVENTION

Continuous tone images do not print well on most printing devices, so the image is usually printed as a screen or pattern of dots. The screen consists of an array of dots or halftone cells, each of which represents one section of continuous tone in the original image. A halftone cell, in turn, consists of a single dot, relatively larger or smaller to represent darker or lighter portions of the original continuous tone image. On a raster display device, a halftone cell can be displayed as a series of display-device pixels. A dark screen dot or halftone cell will have most of the pixels turned on while a light halftone cell will have most of the pixels turned off. A complete screen of the original image is composed of many such halftone cells, each of which has an independent density of displayed pixels and therefore a different apparent darkness when viewed from a distance.

In printing a color image, it is advantageous to have separate patterns of halftone cells oriented differently for each color. Superimposing two highly periodic and regular patterns with some angular offset, however, can lead to interference patterns, known as moiré patterns, which are often shimmering in appearance. One effect, when printed, is bands of color where a flat, even field of color is desired. An additional, independent moiré pattern can even be formed by interference between a first moiré pattern and a third periodic pattern. Printing angled screens on a raster display device often accentuates moiré effects. The screen angle and period must be reproduced very accurately in order to minimize moiré patterns. It is well known in the printing industry that these moiré patterns can be minimized by printing the color screens at certain angles. One classic screen system used by color printers includes a black screen at 45 degrees from horizontal, cyan at 15 degrees, magenta at 75 (or −15) and yellow at 0, with equal periods (the distance of the regular spacing between the centers of halftone dots in the image). Other useful printing angles and factors that allow one to choose useful printing angles are well known to those skilled in the art.

Previous techniques for creating rotated screens on digital devices were either 1) only able to approximate a small number of screen angle and period combinations without using excessive memory, or 2) took an excessive amount of time when implemented as a computer program. The first type of technique did not easily reproduce the angles used in classic color printing screens. U.S. Pat. No. 4,149,194 (Holladay) claimed one such method for printing rotated screens. The screen grid was described by two integral vectors U and V, e.g. $U=(U_x, U_y)$ where $U_x$ and $U_y$ are integers. The "UV space" defined by the UV coordinate system was regular, but generally at an angle to device space. Under these restraints the number of pixels lying within a halftone cell was integral. In addition, the pixels could be arranged in a shape, typically a rectangle, that was the same for each halftone cell. That shape was repeated over the entire image to "tile" the plane of the image. Each halftone "spot" in the final output corresponds to one halftone cell and can be described by a "spot function." The spot function, described below in more detail, describes a reference value for each halftone cell pixel against which each source pixel is compared to ultimately form a halftone spot. Depending on the darkness of the corresponding source image portion, more or fewer of the display pixels will be displayed in each halftone cell. The halftone level can be precomputed for the pixels in one of these tiles, and then these precomputed values can be fetched directly from memory for pixels falling in other tiles.

This method is fast: once the values for a tile have been computed, the remaining values can be obtained very quickly from memory or special registers. Speed is important since a single image may contain millions to tens of millions of pixels to be processed. The disadvantage of this method is that it can only poorly approximate so-called "irrational" screen angles. For example, if one desires the traditional printing screen angle of 15 degrees, the XY coordinates of vectors U or V cannot both be integral. If the XY coordiantes are rounded to the nearest available integer values then the angle and period of the screen grid will be changed enough so that gross moiré patterns will occur when such a screen interacts with other screens.

A second method for computing the halftone level function was claimed in U.S. Pat. Nos. 4,499,489 (Gall) and 4,350,996 (Rosenfeld). The device coordinate system is represented in these patents by XY space and a halftone cell in the screen to be printed is represented by a vector in the UV coordinate system. A displacement of one pixel to the right in XY space can be described as $(a_1, b_1)$ in the (U, V) coordinate system. This precalculated displacement makes it easy to convert a coordinate (X, Y) in device space into UV space if the coordinate (X−1, Y) to the left of (X, Y) already has been calculated. If (X−1, Y) is (a, b) in UV space then (X, Y) is $(a+a_1, b+b_1)$ in UV space. Using this method, after doing the conversion to UV space for the leftmost pixel position in a row of pixels, the conversion for the remaining pixels in that row can be achieved by two additions for each pixel position. It is important to convert pixel positions to the UV coordinate system because the halftone level function can then be easily implemented by calling the spot function with the fractional parts of the coordinates in UV space.

This method is very accurate. Using arithmetic of high enough precision, screens of any angle and frequency can be simulated. This method, however, cannot be as fast as the Holladay method. First of all two additions are required to calculate the coordinates of each pixel in the XY system. Secondly, the spot function must be evaluated at each pixel. This can be speeded up by implementing the spot function as a lookup table, but even that will require some indexing and a memory fetch. Although the number of operations is not great, it is still more than twice that required in the Holladay method.

A method of using threshold matrices to generate halftone images, including certain screen angles, is described in U.S. Pat. No. 4,752,822 (Kawamura). The reading (scanning) and generating (display) devices described therein are generally useful in practicing the present invention as well. The threshold matrix described in Kawamura, however, is of only limited usefulness and can reproduce only limited screen angles and periods.

The technique presented here is an improvement over the prior art in that more angle-period combinations are available and the method can be made to run quickly when implemented as a computer program. Classic screen printing angles were easily, and accurately, reproduced by this system.

One object of this invention is to provide a method for implementing a halftone level function for rotated screens including multiple angle-period combinations and to produce a halftone image formed with a rotated screen on a digital output device.

Another object of this invention is to provide a method of computing halftone screened images that can be made to run quickly when implemented as a computer program.

SUMMARY OF THE INVENTION

The method of this invention can be practiced using any of several devices which may include a scanner, a computer, and some type of raster display device. An original image is mechanically or electronically scanned, calculated, programmed or otherwise prepared for reproduction. The image to be reproduced is divided into source image portions or cells of a size suitable for halftone reproduction, using techniques well known to those skilled in the art. On reproduction, each halftone cell is printed or displayed as a combination of smaller picture elements.

The invention provides an improved method for producing halftone images with halftone cell dimensions and orientation to match a desired screen grid by choosing reference halftone gray values for each pixel in a supertile of representative halftone cells, testing source pixel gray values against corresponding reference gray values and selectively displaying corresponding pixels. The supertile includes more than one halftone cell, is composed of whole pixels, can tile the source image plane when placed side-by-side with copies of itself, and includes halftone cells on adjacent supertiles that, in tiling the plane, align exactly or closely to approximate a smooth halftone screen. Since the supertile can be reproduced, each pixel in the source image corresponds to a single pixel in the supertile, although each supertile pixel generally corresponds to more than one source image pixel. The invention also includes ways of manipulating the supertile for faster output of a halftone image.

A reference halftone level for each pixel in the supertile is calculated or stored in computer memory. A halftone level function for several adjacent halftone cells is illustrated in FIG. 1. The halftone level function, L(X, Y), returns reference values that form a regular repeating pattern of "hills" and "valleys." Each source pixel gray value is compared to the corresponding reference value for that location and, if the source pixel is greater than the reference, a corresponding display pixel is set to be on. This is known in the art as partial dotting. On reproduction, if the source image portion is relatively light then the corresponding output image consists of small black screen dots centered on the valleys. For darker portions of a source image, more pixels are included in each dot to give a bigger screen dot. The halftone level function reduces to just the spot function on a single halftone cell.

The method of this invention solves the problems with the methods of the prior art. The current method has the speed of the Holladay method and the accuracy of the second method. Like the Holladay method, the halftone level function is precomputed on a subset of pixels that tile the plane. Unlike the Holladay method, the unit tile contains pixels from multiple halftone cells, perhaps hundreds, with reference values that change smoothly across the unit tile. The halftone levels in each tile join essentially seamlessly with levels in adjacent tiles to simulate a repeating pattern of hills and valleys at the desired screen angle and frequency. (See FIG. 3.) Such a tile containing multiple halftone cells will be called a supertile.

The supertile can require a fair amount of memory if it is large. Part of this invention is a method for calculating the dimensions of the most accurate supertile when a limited amount of memory is available. Levels must be chosen for individual pixels in the supertile to provide uniform gray levels over the entire supertile to minimize any artifacts produced by using a tile containing more than one halftone cell. A supertile can be deformed for easier pixel manipulation with no resulting loss in output image quality. Lastly cells can be accessed in the supertile in such a way that they correspond to a sequence of source pixels in a row of the image.

DETAILED DESCRIPTION OF THE INVENTION

Figure 1:
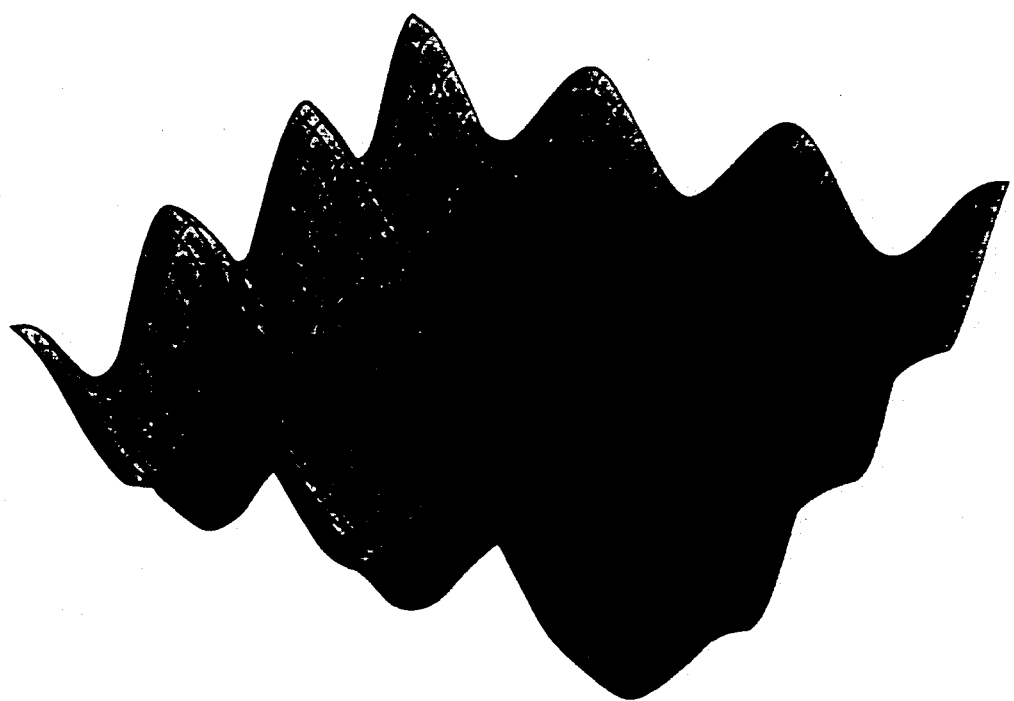
FIG. 1 illustrates the halftone level function L(X, Y) as a three dimensional plot.

The present method was practiced using a computer program residing in a computer to control a display device such as a monitor, laserprinter or phototypesetter. One skilled in the art will recognize that the invention could be implemented in other ways, but the present invention will be described for simplicity in terms of a computer program. The results of the method of this invention also can be placed in a frame buffer in computer memory, then imaged by the typesetter using commonly understood techniques.

The image to be halftoned was mapped onto and subdivided by a fine grid of picture elements (hereafter known as a "pixel grid") and stored in computer memory. The present invention can also be practiced by scanning a source image "on the fly" and calculating the proper display without storing much or any of the source image. Source pixels were organized in a two dimensional array of rows and columns in the "source coordinate system" indexed by an X coordinate (columns) and a Y coordinate (rows). The position of each source pixel was defined as (X, Y), referenced from an origin (0, 0). The number of pixels in a row was denoted by W (for width) and the number of pixels in a column was denoted by H (for height). The origin was chosen to be the center of the lowest, leftmost source pixel in the rectangular image, thus (X, Y) referred to the center of the pixel located X pixels from the left and Y pixels up from the bottom of device coordinate space.

The halftone image was displayed on a device pixel grid essentially identical to the source image pixel grid in period and angle. The device pixel grid defined where dots could be imaged on the recording or printing medium. The method of the present invention is described below assuming that the source grid and device grid can be superimposed in such a way that one image pixel corresponds to exactly one device pixel. If this is not the case the source pixels can be supersampled or undersampled using techniques well known in the art. In addition, one skilled in the art will understand how to perform the resampling as part of accessing the original data and not be required to produce the complete resampled image beforehand. Thus, a W by H subarray of source pixels corresponded to some W by H subarray D of device pixels.

The halftoning process of the present invention was used to convert the original image from source pixels having a potential range of many gray values to device pixels that essentially can be only "on" or "off." The brightness of the original image inside each grid pixel, referred to as a "source pixel," was approximated by a single gray value constrained to be an integer lying within a known range (e.g. 0 to 255). The value 0 was chosen to correspond to white and the largest value within that range was chosen to correspond to black. Intermediate values were assigned to levels of gray, generally analogous to how much black ink needs to be applied to a printed page to match that brightness level. The reverse correspondence (where white is high) can be used equally well in practicing this invention. The present invention was first practiced using a display device wherein the device pixels had only values of "on" or "off," either 0 or 1, thus 0 was chosen to correspond to absence of a dot and 1 for presence of a dot, which was black if recorded on white media. One skilled in the art will recognize that the method of this invention also can be practiced using a display device to represent a range of gray or color values beyond simply "on" and "off," e.g. 2, 3 or 4 bits. The notation S(X, Y) was used to denote the value assigned to the source pixel in column X and row Y and D(X, Y) to denote the value assigned to the display pixel at position (X, Y).

Traditionally, a screen is used to divide the source image into a series of halftone cells with a desired angle and spacing. For purposes of this invention, the screen grid was divided into a series of halftone cells and a halftone level function, L, was calculated for each pixel by using the spot function. The function L(X, Y) was calculated to have values that formed a regular repeating pattern of "hills" 10 and "valleys" 11 (illustrated in FIGS. 1, 3) across adjacent halftone cells, the valleys being areas where L was calculated to have values near the bottom of the allowable source pixel value range and hills being areas where L was calculated to have values near the high end of the allowable source pixel value range.

The spot function can theoretically be any function taking two arguments (a, b) in the range 0 to 1 (for each dimension of the unit cell) and returning a value between 0 and the maximum source pixel value. It is advantageous to use a spot function that returns low values when (a, b) is near one of the corners of the halftone cell and high values when (a, b) is near the center of the halftone cell (or vice versa). This results in well formed dots that grow from the corners of the screen grid and meet finally in the middle of the screen grid cells. One useful such function is:

$$\left\{ \frac{a\sin(\cos(a^*\pi) + \cos(b^*\pi)) + 1}{2} \right\} * M$$

where M is the maximum source pixel value. One skilled in the art will recognize that the present invention will work with many spot functions. Different spot functions can be used to create different shaped halftone dots, which can be important in some applications. A spot function can be rather complicated, including more than one maximum or even a representation of a graphic object, fanciful design or photograph.

Each source pixel value, S(X, Y) was compared to a "halftone level" value L(X, Y) calculated for each source pixel coordinate location. The device pixel value D(X, Y) was set to 1 if the source pixel was greater than the halftone level and 0 otherwise. The resulting displayed image was a conventional halftone image. In light source image areas, adjacent source pixels were mostly low in value and S(X, Y)>L(X, Y) was true only at the centers of the valleys, resulting in an output image of small black dots with only a few display pixels being displayed, centered on the valleys. For darker areas with larger S(X, Y), the displayed dots were bigger as more pixels were included in each dot. In dark source image areas, where the source pixels had generally high levels, S(X, Y)>L(X, Y) was true most everywhere except at the tops of hills and the resulting output image consisted of small white dots (centered on the hills) against a black background.

Figure 2:
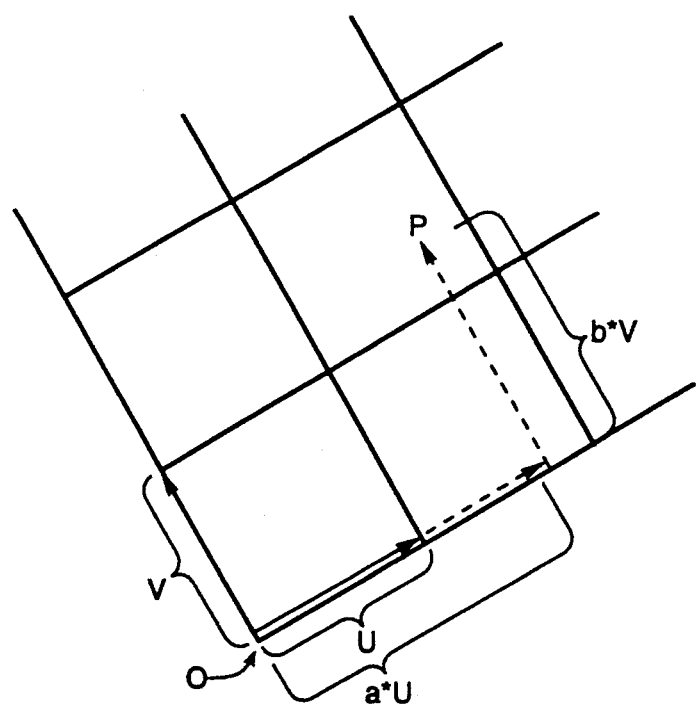
FIG. 2 illustrates vectors U and V in the UV coordinate system in reference to the XY coordinate system and how a point can be described in UV space as a sum of vectors U and V.

The screen grid was defined as the grid specifying the centers of the valleys in the above-mentioned halftone level function, which in turn determined the centers of the black dots in the output halftone image. Using the method of this invention, the screen grid could be rotated to any desired angle with respect to the display pixel grid. The dot spacing or frequency of the screen grid could take any reasonable value, for example in the range of ten to forty pixels between each halftone center. For example, a Linotronic typesetter which displays 2540 dots per inch can display a 130 line per inch screen using approximately 19.5 pixels per halftone cell (each side). A screen grid at an arbitrary angle was specified by unit cells bounded by vectors $U=(U_x, U_y)$ and $V=(V_x, V_y)$ that determined the sides of each of halftone cell in the screen grid. See FIG. 2. The coordinate system for the screen grid (designated the UV coordinate system for the purposes of this invention disclosure) based on the vectors U and V was independent of the source or display pixel grid. The origin of the UV coordinate system can be set anywhere, but preferably coincides with the origin of the device coordinate system: the center of the lowest, leftmost source pixel in the image in this example. Each point P could be specified in the UV coordinate system by a pair of numbers (a, b) such that $P = a*U + b*V$, that is 'a' and 'b' tell how much of vectors U and V were needed to get to the point P. (See FIG. 2.)

The value of the halftone level function, L, was most easily specified in terms of 'a' and 'b' where a point P can be described by coordinates (a, b) in the UV coordinate system or by (x, y) in the display coordinate system. Both 'a' and 'b' have an integer part corresponding to an integer number of halftone cells, and a fractional part corresponding to a location within a halftone cell. The integer parts of 'a' and 'b' determine which halftone cell (x, y) lies in. The fractional parts determine where within that halftone cell (x, y) lies. Since L repeats from cell to cell, only the fractional parts of 'a' and 'b' were significant in determining $L(X, Y)$; the integer parts do not matter. These fractional parts were used as arguments to the spot function to determine the halftone level function L at position (x, y).

DESCRIBING A SCREEN GRID BY VECTORS OR COMPLEX NUMBERS

The present invention uses a screen grid composed of square cells of some size rotated through some angle (the screen angle). Almost all grids typically used for halftoning are square. As illustrated in the flow chart in FIG. 8, one way of describing a screen grid based on a square grid is based on the fact that the vector V (of the UV coordinate system) is equal to the vector U rotated through 90 degrees. Therefore, the vector U completely determines the screen grid.

The vector U has two components: $U_x$ and $U_y$. U also can be considered as a complex number with $U_x$ the real part and $U_y$ the imaginary part. For example, if U is a complex number then i *U, (where i is the square root of −1) is U rotated by 90 degrees which is exactly V. The complex product, (a+ib) * U, converts the coordinates (a, b) in UV space to coordinates in device space:

$$(a+ib)*U = a*U + b*iU = a*U + b*V.$$

From this it follows that if (x, y) were coordinates in device space then (a, b), the corresponding coordinates in UV space, can be calculated by means of division by the complex number U:

$$\frac{x + iy}{U} = a + ib$$

This provides a convenient method for changing between coordinate systems. This is useful, not only as a means of practical calculation, but also as a tool to prove certain properties about the square screens often involved in halftoning.

USING SUPERTILES

Figure 3:
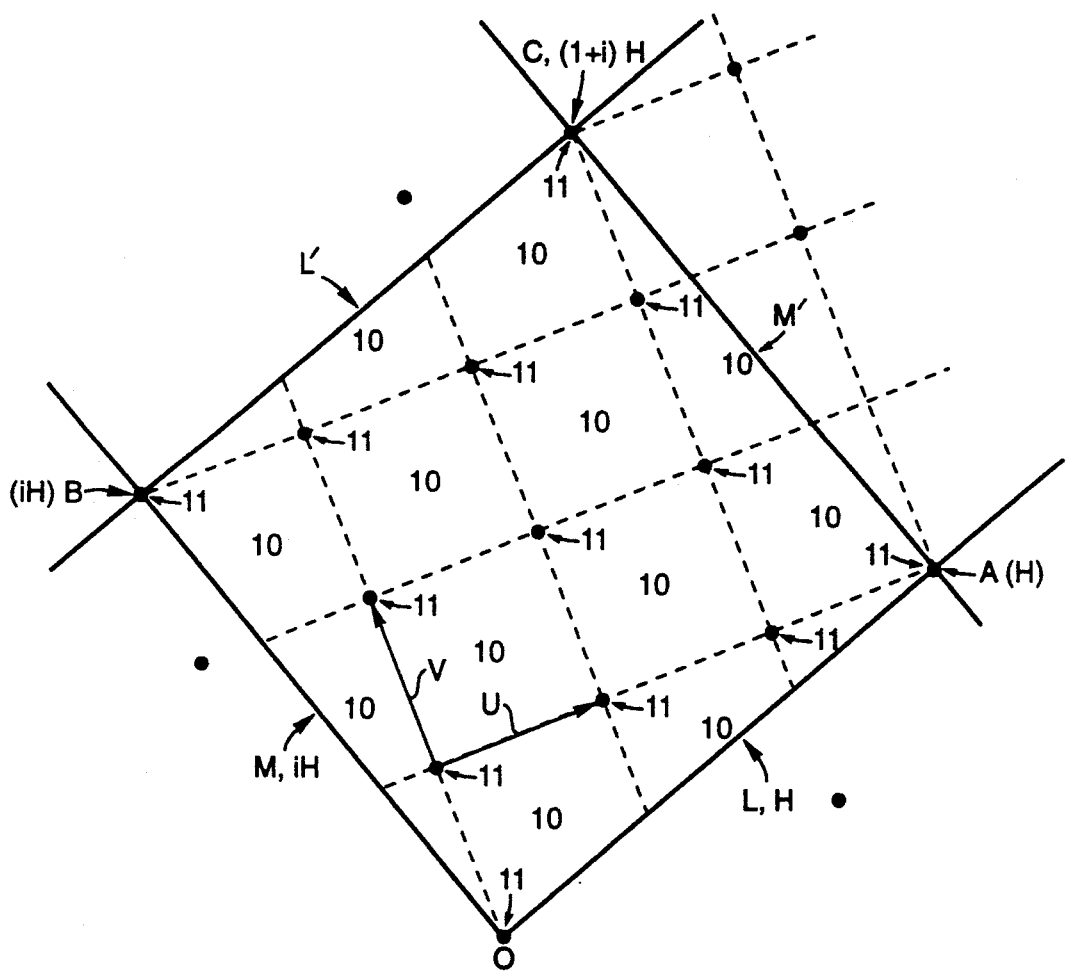
FIG. 3 illustrates a supertile comprised of multiple halftone cells, with maxima or hills 10 and minima or valleys 11, supertile origin O and sides M, M', L and L' defined by vectors H and iH, mapped in UV space, and portions of adjacent supertiles.

In order to calculate halftone level functions for a screen grid composed of halftone cells that can be rotated by some arbitrary angle with specified spacing, the method of the present invention uses a "supertile," illustrated for example in FIG. 3. A supertile consists of multiple halftone cells but does not necessarily include only whole halftone cells. A supertile can be duplicated and aligned in repetitive fashion to cover the entire image plane while keeping the contained halftone cells essentially in registration throughout the plane.

The supertile of the present invention has three useful properties: a) its boundaries coincide with pixel boundaries—or to put it another way: it consists of whole pixels only, not fractions of pixels; b) it can be duplicated repeatedly and placed side by side to "tile" (cover) the image plane and c) if the desired screen grid is superimposed on all supertiles in the same way, the screen grid pattern on adjacent supertiles will mesh very closely.

FIG. 3 illustrates the screen grid superimposed on a supertile. The supertile has four corners O, A, B, C, and four sides L, M, L', M'. In all cases, the supertile corners all intersect device grid corners exactly. In this example, the corners, O, A, B and C, also intersect screen grid corners. In general, the line connecting adjacent corners of the supertile does not follow pixel boundaries which violates property a), but the method of this invention includes a deformation of the supertile, when needed, so this potential problem was avoided as described below. The line from point O to point A can be described by vector H, which in turn can be described as a complex number. Similarly, the line from point O to point B can be described by vector iH. For a square supertile, when the supertile is duplicated to tile the plane, a side L of the supertile will abut a side L' on an adjacent supertile, and a side M will abut a side M' on another adjacent tile. Each side L or L' crosses the screen grid (and the source pixel grid) at exactly the same places relative to their left hand end points because they both start on a corner of the screen grid, they both follow an equivalent path and have exactly the same net slope. Therefore when a side L in one supertile abuts a side L' in an adjacent supertile the superimposed screen grid pattern on the tiles will match. The same relationship applies to sides M and M'. Thus, the screen grid pattern superimposed on one supertile will mesh across supertile boundaries, if the corners of the supertile intersect corners of the screen grid.

If the corner O of the supertile falls on a corner of the screen grid and corners A and B also fall exactly on corners of the screen grid then the vector from O to A, and similarly the vector from O to B, can be expressed as an integral number of copies of the vector U plus an integral number of copies of the vector V:

$$A\text{-}O = a*U + b*V \tag{1a}$$

where a and b are integers.

$$B\text{-}O = c*U + d*V \tag{1b}$$

where c and d are integers.

But the vector A-O corresponds to the complex number H (at point A in FIG. 3) and B-O corresponds to iH. Writing equations (1a) and (1b) above in complex form and substituting iU for V gives:

$$H = a*U + b*iU = U*(a+ib) = U*K \tag{2a}$$

$$iH = c*U + d*iU = U*(c+id) \tag{2b}.$$

If a and b are both integers, as is true at screen grid corners, K is a Gaussian integer, that is, a complex number having real and imaginary coefficients that are both integers. Equation (2a) is one way of showing that H has integer coordinates in UV space: H is the product of U with another Gaussian integer, $K=(a+ib)$. Since $U*K=H$ then, multiplying both sides by i,:

$$iH = iU*K = U*(iK) \qquad (3).$$

Thus iH is also the product of U with a Gaussian integer, so iK also has integral coordinates in UV space. In other words if H has integer coordinates in UV space then so does iH, so once H is chosen to have integer coordinates, the remaining corners of the supertile will also have integer coordinates. Use of integer values for a and b facilitates convenient and rapid calculation of supertiles.

ALLOWABLE ERRORS

The method of the present invention is also useful when supertile corners do not fall exactly on screen grid corners, but are generally close. In fact, it usually is the case that no supertile has corners that fall exactly on the device grid corners and screen grid corners. Suppose the difference from A to the nearest screen grid corner is the complex number E. Since the screen grid is square it turns out that B will be separated from the nearest screen grid corner by i*E. Now if E is substantially smaller than the distance between adjacent pixels, the superimposed screen grid pattern on adjacent tiles will mesh closely enough that there will be no noticeable boundary visible on the finished halftone. This was found to be particularly true for halftone cells containing many pixels or when the device resolution was such that an individual pixel itself was barely perceivable in the final output.

Another problem was introduced if some difference is allowed between supertile and screen grid boundaries. The screen grid shifted slightly going from one supertile to an adjacent supertile, by an amount equal to E if the tiles touch on the M—M' edges or i*E if they touch on the L—L' edges. This shift accumulated at boundaries further and further from the original supertile, so after N tiles the shift was amplified to equal N*E. This accumulating shift changed the effective angle represented by a tiling of the superimposed screen grid on the supertiles. In order to prevent moirés with other halftones in a color separation the total accumulated shift in the screen grid must be less than a small fraction of the period of the screen grid, preferably smaller than $\frac{1}{4}$, over the entire image. Thus if N was the number of tiles traversed to the right and M was the number of tiles traversed upwards, the total shift is preferably limited by $$|i*E*N + E*M| < \tfrac{1}{4}*P \qquad (4)$$

where the bars surrounding an expression denote the complex absolute value and where P is the period of the screen grid in pixels. For example, if $Q=(c+id)$ then $|Q|=\sqrt{c^2+d^2}$ Rigorous error analysis and repeated experiments verify that some degree of error can be tolerated. The suggested value of $\frac{1}{4}$ gives generally good results but one skilled in the art will recognize cases where a higher or lower limit will give satisfactory or superior results.

APPROXIMATION BY A RATIO OF GAUSSIAN INTEGERS USING THE METHOD OF CONTINUED FRACTIONS

If small distances are acceptable between the corners (A) and (B) in FIG. 3 and the corners of the screen grid, equation (2a) becomes:

$$H = U*K + E \quad |E| < e \qquad (5)$$

Figure 4:
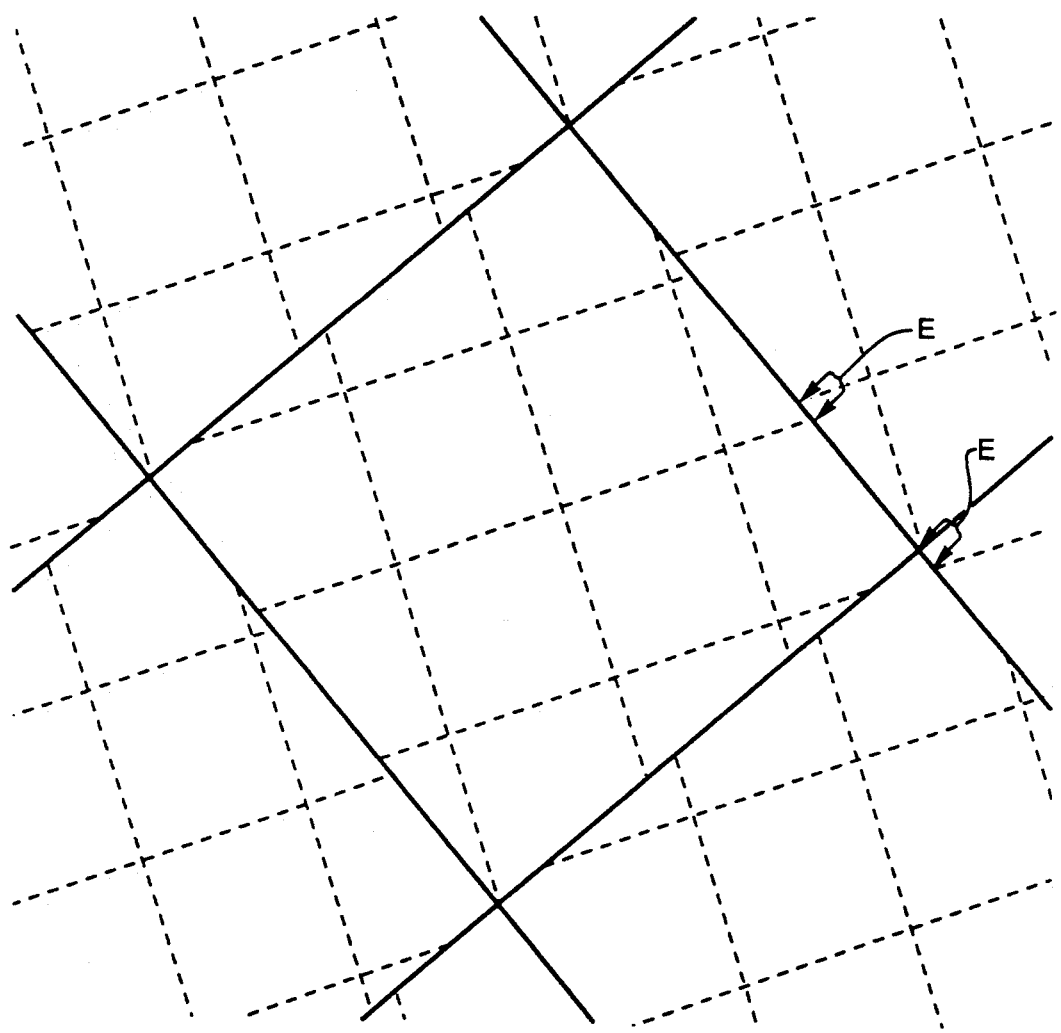
FIG. 4 illustrates the relation of a supertile to the screen grid and the alignment shift of adjacent supertiles.

In other words, the supertile, given by H, was equal to the screen grid, U, expanded by some Gaussian integer K plus some small error, E. The complex number E was the "tiling error" which limited how much the superimposed screen grid pattern was allowed to shift between adjacent supertiles. FIG. 4.

Equation (5) can be written:

$$U = \frac{H}{K} - \frac{E}{K} \qquad (6)$$

The complex number U, representing the screen grid, can therefore be described as the ratio of Gaussian integers minus a correction factor, which should be as small as possible. The "size" of the number H preferably should be limited because, according to the method of this invention, the size of H corresponds to the amount of memory, ($|H|^2$ memory units), required to store a supertile based on H. This value is limited in most computers, although some computers can accommodate a very large H.

An integer solution for Equation 6 can be found readily using the method of continued fractions. The problem was analogous to the problem of finding the best approximation to a real number, r, with a rational number, n/m, such the 'n' was limited to a certain maximum size. Using complex numbers, the technique of continued fractions can be extended to Gaussian integers to obtain two sequences of Gaussian integers $\{H_0, H_1, H_2, \ldots\}$ and $\{K_0, K_1, K_2, \ldots\}$ such that each successive ratio, $H_n/K_n$ was a better approximation to U than the previous ratio and such that the size of $H_n$ was always increasing, until the approximation was good enough, limited by the maximum $H_n$ available in the selected system.

Figure 8:
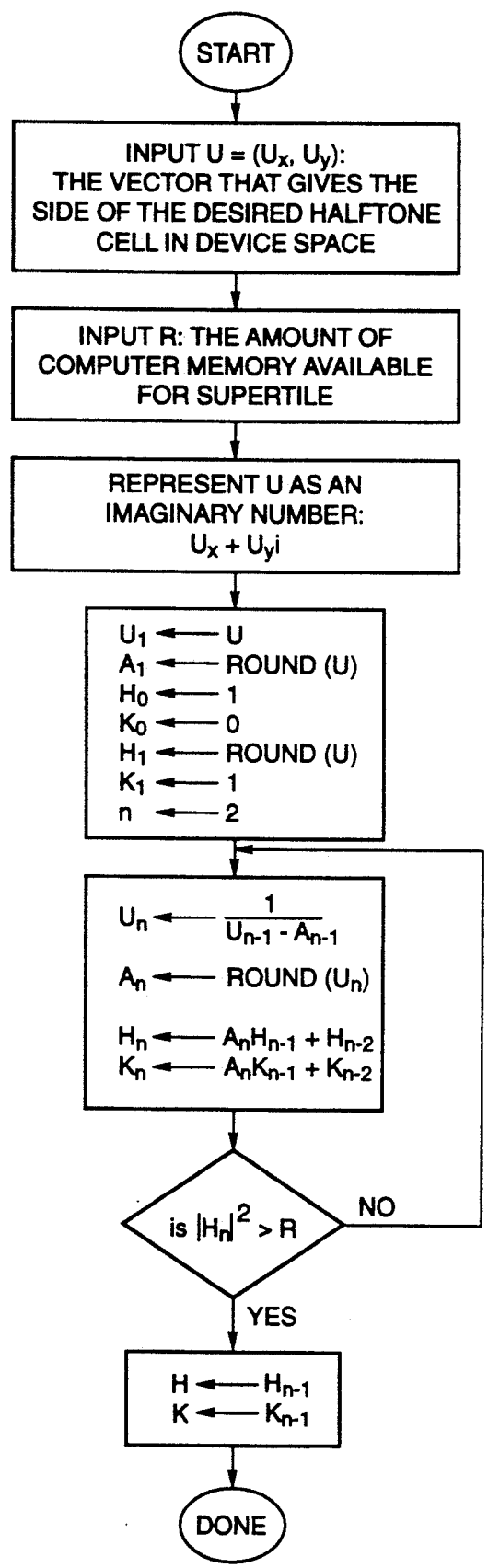
FIGS. 8-12 are flow charts illustrating the computer program used in the method of the invention.

As shown in the flow chart in FIG. 8, the first two pairs of complex numbers in these sequences were defined explicitly: $H_0=1$, and $K_0=0$. (Note that ratio $H_0/K_0$ was undefined, but this was acceptable since $H_0$ and $K_0$ were used only to define later terms in the series recursively.) The next pair of terms was $H_1=\text{Round}(U)$ and $K_1=1$, where the "Round" function rounds the real and imaginary parts of a complex number to the nearest integers. For $n \geq 2$, the remaining terms then were defined recursively, $$\begin{aligned} H_n &= H_{n-1} * A_n + H_{n-2} \\ K_n &= K_{n-1} * A_n + K_{n-2} \end{aligned} \qquad (7)$$

$A_n$ was chosen so that errors in the $(n-1)$ step and the $(n-2)$ step cancelled out as much as possible.

A computer program was used to provide a simple way of computing the complex terms $\{A_1, A_2 \ldots\}$. One skilled in the art will recognize that it is not difficult to code such a program. Starting with another complex sequence $\{U_1, U_2 \ldots\}$, $U_1$ and $A_1$ were set as $U_1=U$ and $A_1=\text{Round}(U_1)$. The subsequent A's were defined by the recursive formula:

$$U_n = \frac{1}{U_{n-1} - A_{n-1}} \qquad (8a)$$

$$A_n = \text{Round}(U_n) \qquad (8b)$$

A third sequence $\{E_1, E_2 \ldots\}$ was defined where $E_n = U^*K_n - H_n$. Thus, $E_n$ was the number giving the shift error for a supertiling based on $H_n$. The shift errors, $\{E_1, E_2 \ldots\}$ get progressively smaller in absolute value.

$$E_n = U^*K_n - H_n \qquad (9).$$

Taking $$G = \text{Round}\left(\frac{E_{n-2}}{E_{n-1}}\right) - \frac{E_{n-2}}{E_{n-1}},$$

it can be shown that $$E_n = -E_{n-1}{}^*G.$$

The number G can be thought of as $\text{Round}(X) - X$ where $$X = \frac{E_{n-2}}{E_{n-1}}.$$

Since the Round function changes the real and imaginary parts of a number by no more than $\frac{1}{2}$, the difference $\text{Round}(X) - X$ can have real and imaginary parts no bigger than $\frac{1}{2}$. Thus the absolute value of $\text{Round}(X) - X$ can be no larger than $1/\sqrt{2}$. This implies:

$$|E_n| \leq \frac{|E_{n-1}|}{\sqrt{2}} \qquad (10)$$

Thus, the shift error goes down by a factor of at least the square root of two for each new term in the sequence. In actual practice, the shift error goes down much faster.

The sequences $\{H_n\}$, $\{K_n\}$, $\{A_n\}$ and $\{U_n\}$ could thus be defined solely by the complex number $U_1 = U$. Successive terms in this sequence were easily computed on a computer. These computations were done in a loop until $|H_n|^2$ would have exceeded the amount of memory available for the supertile. At this point the previous values, $H_{n-1}$ and $K_{n-1}$ were saved. $H_{n-1}$ determines a square shaped supertile upon which the screen grid can be superimposed. The theory of continued fractions guarantees that the shift error in the screen grid from tile to tile will be the smallest possible for that size supertile.

For simplicity of notation, H will be used to denote the complex number specifying the supertile and K to denote a Gaussian integer such that $U^*K$ was very close to H. By using the method of this invention, H/K was a calculated to give a very close approximation to U.

ERROR ANALYSIS

It is desirable to limit screen grid pattern offset between supertiles, compared to the ideal screen grid pattern, such that the cumulative shift is less than some fraction of the period of the screen grid over the entire image as the supertile tiles the entire image. Limiting the total shift to $\frac{1}{8}$ of the screen grid period gives satisfactory results. One skilled in the art will recognize other limits that may be appropriate given certain memory or resolution restrictions. For example, by starting tiling in the lower left hand corner of a rectangular image, the shift in the screen grid will be greatest at the furthest point from this corner of the image: the upper right hand corner. If D is taken to be $D = (x + iy)$, a complex number representing the distance from the lower left of the image to the upper right of the image (x pixels across and y pixels up), D can be converted to supertile coordinates T by dividing by H: $T = D/H$. Thus, if $T = (a + ib)$, then it takes 'a' supertiles in the direction of H and 'b' supertiles in the direction of iH to get to the point D. It does not matter for this analysis that 'a' and 'b' may be fractional. If E was the shift error per tile then the total shift error at point D was $T^*E = D^*E/H$. The error can be limited, preferably to less than $\frac{1}{8}$ period:

$$\left|\frac{DE}{H}\right| < \frac{|U|}{8} \qquad (14)$$

$$\Rightarrow |E| < \frac{|U|*|H|}{|D|*8} \qquad (14a)$$

Since U is the complex number defining the screen grid, $|U|$ is the period of the screen grid in pixels.

E in above equation can be defined by $E = U^*K - H$, the same relationship used in the derivation of H and K. The theory of continued fractions for integers shows that $|E| < |1/K|$, a result that extends to complex numbers. To make E as small as was shown in equation (14) then $1/|K|$ should be made correspondingly small:

$$\frac{1}{|K|} < \frac{|U|*|H|}{|D|*8} \qquad (15)$$

But since H/K has been selected to give a very good approximation to U the above formula can be written as:

$$\frac{1}{|K|} < \left|\frac{H}{K}\right| * \frac{|H|}{|D|*8} \qquad (16)$$

$$\Rightarrow 1 < |H| * \frac{|H|}{|D|*8}$$

$$\Rightarrow 8*|D| < |H|^2$$

The last equation is useful in examining certain limits.

Analysis and experimentation showed that choosing an H/K approximation to U such that the absolute value of H squared was greater than the diagonal distance across the image in pixels times 8, gave satisfactory results for the supertile described by H. For larger H, the results were even better. The number of pixels in the supertile, and the amount of memory required, was no more than $|H|^2$. The approximation of the screen grid is often good if H was smaller but using H of a certain size merely insured that the approximation was good. There is, however, no guarantee that an approximation H/K to U exists where H was anywhere near the desired value of $|D|*8$.

There were situations where the difference between successive values for H was large and inconvenient, for example $|H_{n-1}|$ was too small, but $|H_n|$ was much too large. Fortunately this was rarely the case. Using a computer with twice as much memory as required by formula (16), 16*|D| bytes, then almost any random U can be approximated with enough accuracy. This has been verified by printing random screens using the method described in this patent. In particular 15 and 75 degree screens of many periods were easily approximated. As one example of the memory required, using an 8 and ½ inch by 11 inch screen image on a device with a resolution of 1270 dots per inch, |D| is 17,655 and |D| times 16 is 282,480 bytes of memory. This is a modest amount considering that many modern typesetters have up to 8 million bytes of memory installed.

DEFORMATION OF THE SUPERTILE (UTAH TILES)

The supertile of this invention is easier to use if the shape of the supertile is modified. One of the original conditions on the supertile was that its boundaries not intersect device pixels. Since the rotated square described above will intersect pixels if the sides are simply straight lines at an angle, to use an angled supertile, a path must be described for each edge that includes whole pixels. Each pixel that touches the edge of a supertile can, for instance be included if the pixel center falls within the supertile. If the pixel center falls directly on an edge there will be a corresponding pixel centered on the opposite edge and an appropriate scheme should be used to select only one of the corresponding pixels. One skilled in the art will recognize other ways of choosing a path to meet the criterion of using only whole pixels.

Figure 5A:
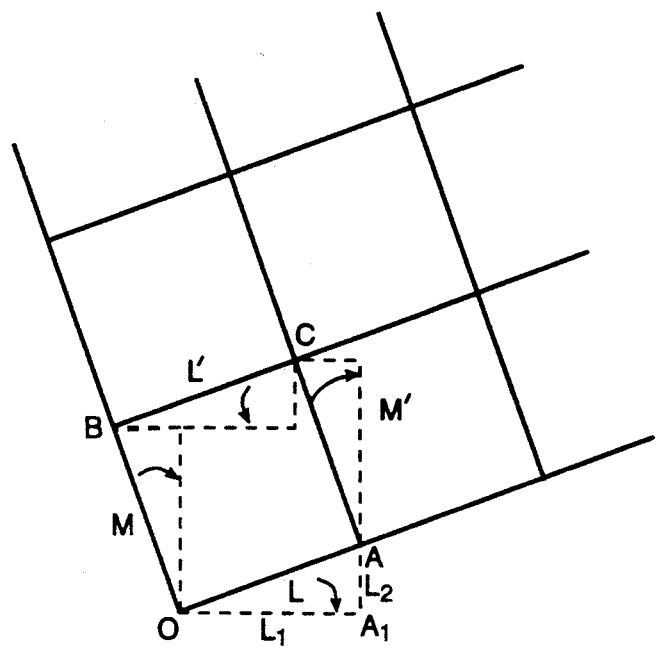
FIGS. 5A, 5B illustrate deformed supertiles displayed in XY space using Utah tiles.
Figure 5B:
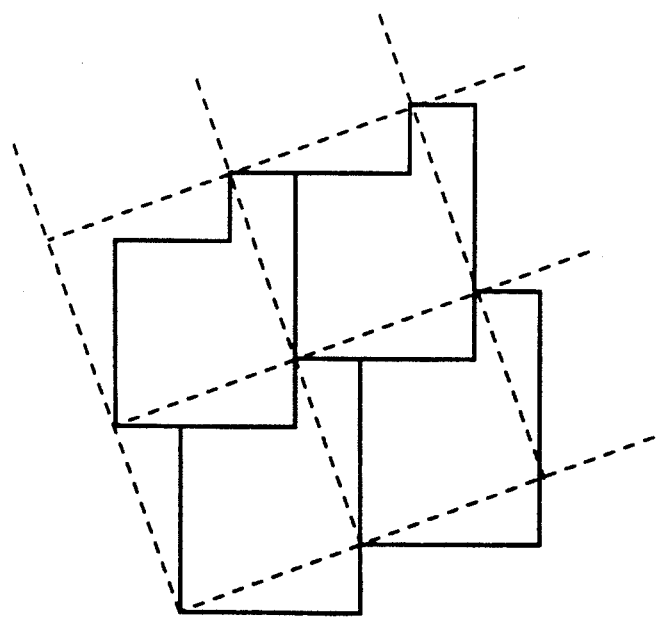

The supertile can also be reshaped or deformed to meet this criteria. See FIG. 5a. Starting with a supertile having side L starting at point O and going to point A and parallel side L', side L is deformed from its former vector of $L=(a*U+b*iU)$ to a horizontal vector $L_1=a*U$ to point $A_1$ and a vertical vector $L_2=(b*iU)$ from $A_1$ to A. By the conditions originally imposed on the supertile, both O and A have integral coordinates in device space, thus the horizontal and vertical line are on pixel boundaries. Since side L' must still abut side L in a tiling, side L' must be deformed in the same way into a horizontal and vertical line. Since corners B and C are on integral device coordinates these two lines also lie on pixel boundaries. We do a similar deformation for lines M and M' as shown in FIG. 5a. The resulting supertile consists of a figure which is essentially two squares resembling the shape of the state of Utah. This "Utah-tile" maintains many of the same properties of the original rotated square supertile but in addition it consists of whole pixels and has other desirable properties that facilitate quick retrieval of halftone levels corresponding to a row of pixels. Note that the dimensions of one square of the Utah-tile were A by A where A was the real part of H and of the other square were B by B where B was the imaginary part of H.

SETTING HALFTONE LEVELS IN THE SUPERTILE

The deformed supertile can be superimposed with the screen grid such that the screen grid meshes exactly or at least closely across supertiles. The dimensions of such a supertile need only be calculated once for a given screen angle and period. It is sometimes desirable to recalculate the supertile if more or less memory in a given computer system can be allocated to storing a set of halftone levels.

Figure 9:
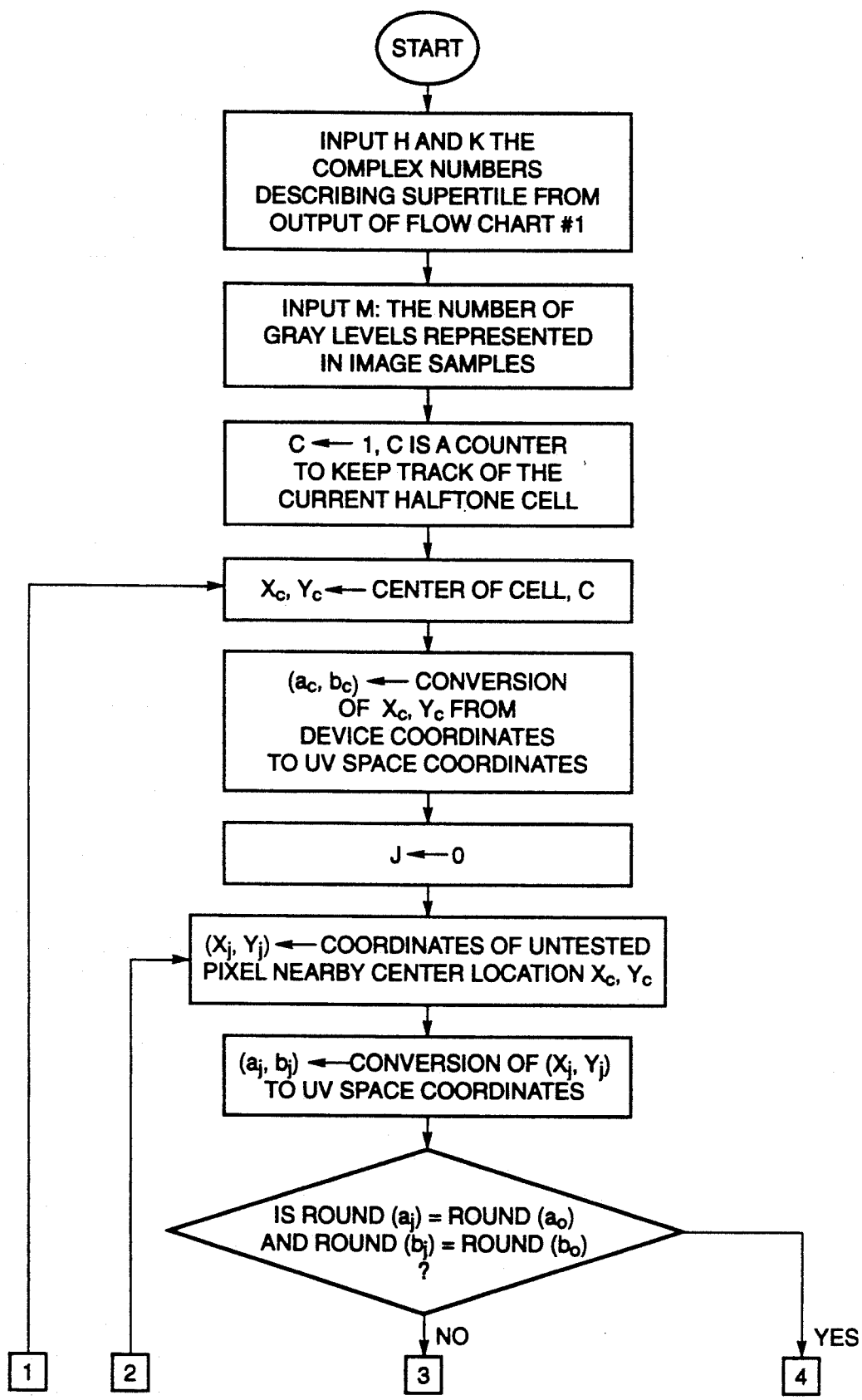
Figure 10:
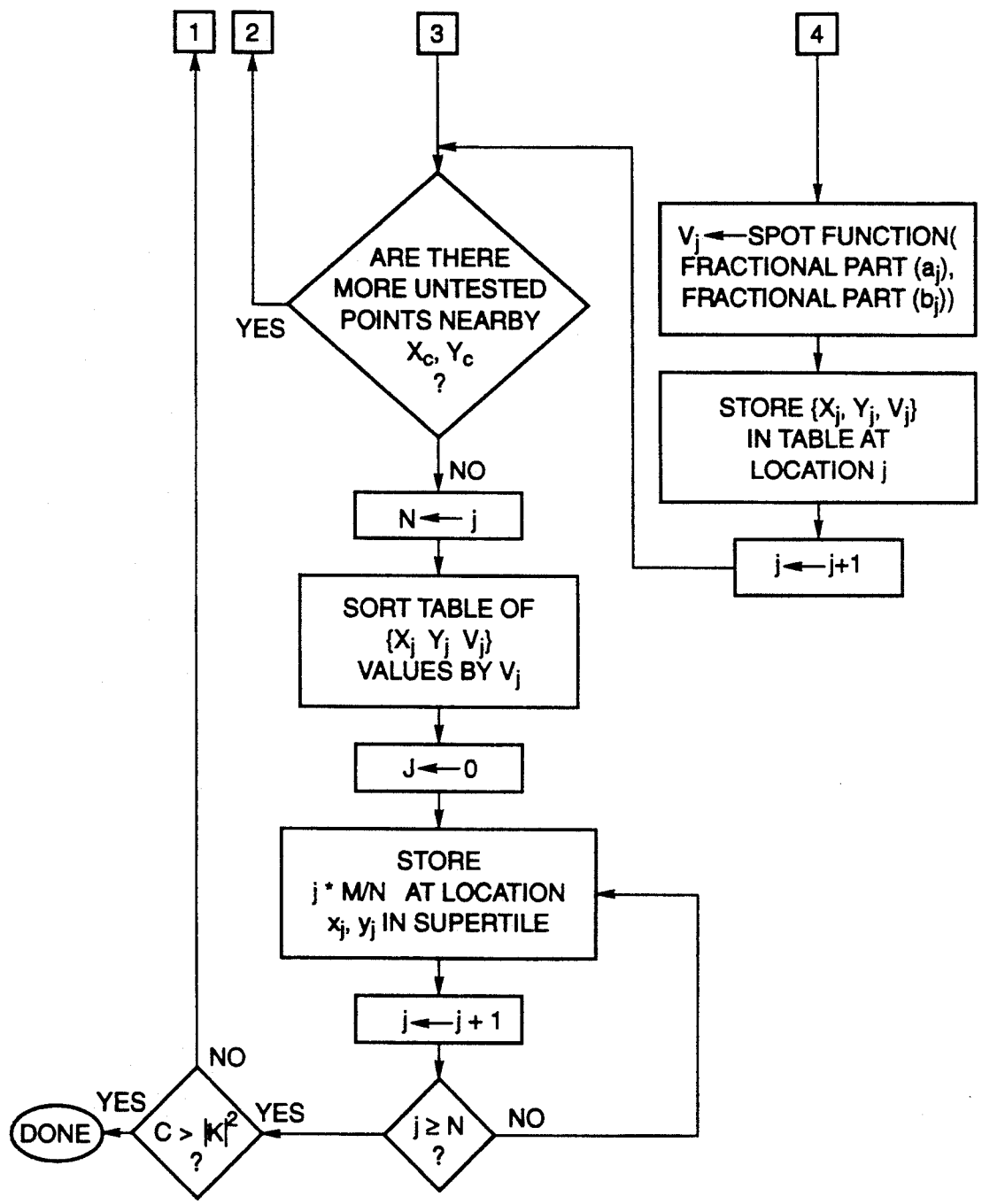

One method of practicing the present invention begins by setting aside memory locations for each pixel in the supertile and filling those locations with values that correspond to the halftone level function, L. As shown in the flow chart in FIGS. 9–10, a screen grid pattern is chosen using the method of continued fractions described above, based on the complex number H/K instead of U to allow some small deviation since H/K can be chosen to be close enough to U so that this won't matter.

Figure 6:
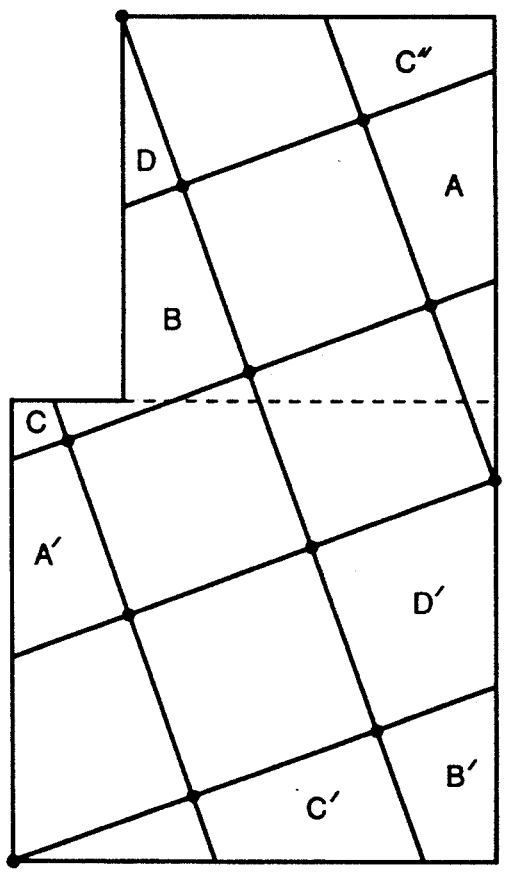
FIG. 6 illustrates how halftone cells fit within a Utah tile.

The resulting pattern contains exactly $|K|^2$ halftone cells in the supertile. Levels are then set in the pixels corresponding to each of these cells according to the spot function desired or selected by the user of the system. Some of these halftone cells may overlap the boundary of the supertile. For instance, if part of a cell D hangs off the right side of the supertile then there will be an equivalent cell D' in the supertile to the left with an equivalent part hanging off into the original supertile. These two separate parts can be considered together to make one whole cell. See FIG. 6. Since the halftone cells so calculated will be rotated squares that cross through pixels, it is possible to determine which halftone cell a pixel was in by where the center of the pixel falls. If the center of a pixel falls on the boundary between cells it was arbitrarily assigned to the leftmost or bottommost cell. One skilled in the art will recognize that other arbitration schemes can be used to allocate pixels that fall on a cell boundary. The following steps are performed for each of the $|K|^2$ halftone cells in the supertile.

First, determine the location of the center of the current cell in device space. All nearby pixels surrounding this location were tested to see if their centers fell in the current halftone cell. Pixel coordinates were transformed from device space to UV space to see if the integer parts were in the current cell. If the pixel was in the current cell, the fractional parts of its coordinates in UV space were fed to the spot function. That result was recorded along with information showing the coordinates of the pixel, and added to a list of records for other pixels in the current cell.

After processing all the pixels in the current cell in this way the list of records was sorted according to the value returned by the spot function. A superior image was achieved if halftone levels were assigned uniformly across all the values in the sorted list. Thus, if there were N pixels in the cell and a total of M gray levels in the source pixels, the jth pixel in the sorted list was assigned the value of j*M/N rounded to the nearest integer. If the magnitude of M is relatively large compared to the number of pixels in a halftone cell, then there may be gaps in the discrete gray values actually assigned to each pixel, but if the magnitude of M is relatively small, there may be duplicate gray values. Referring to the coordinates of the pixel as stored with its record, this value was stored in the corresponding supertile memory location.

If the above scheme is used with spot functions that have lowest values at the corners and highest values in the center, the method can be modified slightly to avoid the situation where four cells, all clustered around one corner coincidentally are assigned the same halftone level, which will cause that corner to appear to dark relative to the general gray level thereby causing an uneven level of gray. One skilled in the art will recognize how to modify the sorting step above to insure that not too many of the lowest few consecutive halftone levels are assigned to any one quadrant of a halftone cell. For example, in the example described herein where the "corners" of the halftone cell are valleys or areas with low halftone level function, the lowest few (approximately 5-10% of the total number of levels) levels can be assigned arbitrarily, for example, by assigning the lowest to the lower left quadrant (if the halftone cell is oriented approximately horizontally), the next to the lower right quadrant, then the upper right quadrant, and so on until enough levels have been assigned. For example, if the pixel in each farthest corner in a cell oriented horizontally were initially assigned duplicate values, e.g. 4, these cells could be sorted, then assigned values of, e.g. (going top-left clockwise around to bottom-left) 2, 3, 5, and 6.

GENERATING SCAN LINES OF HALFTONE LEVEL DATA

Figure 11:
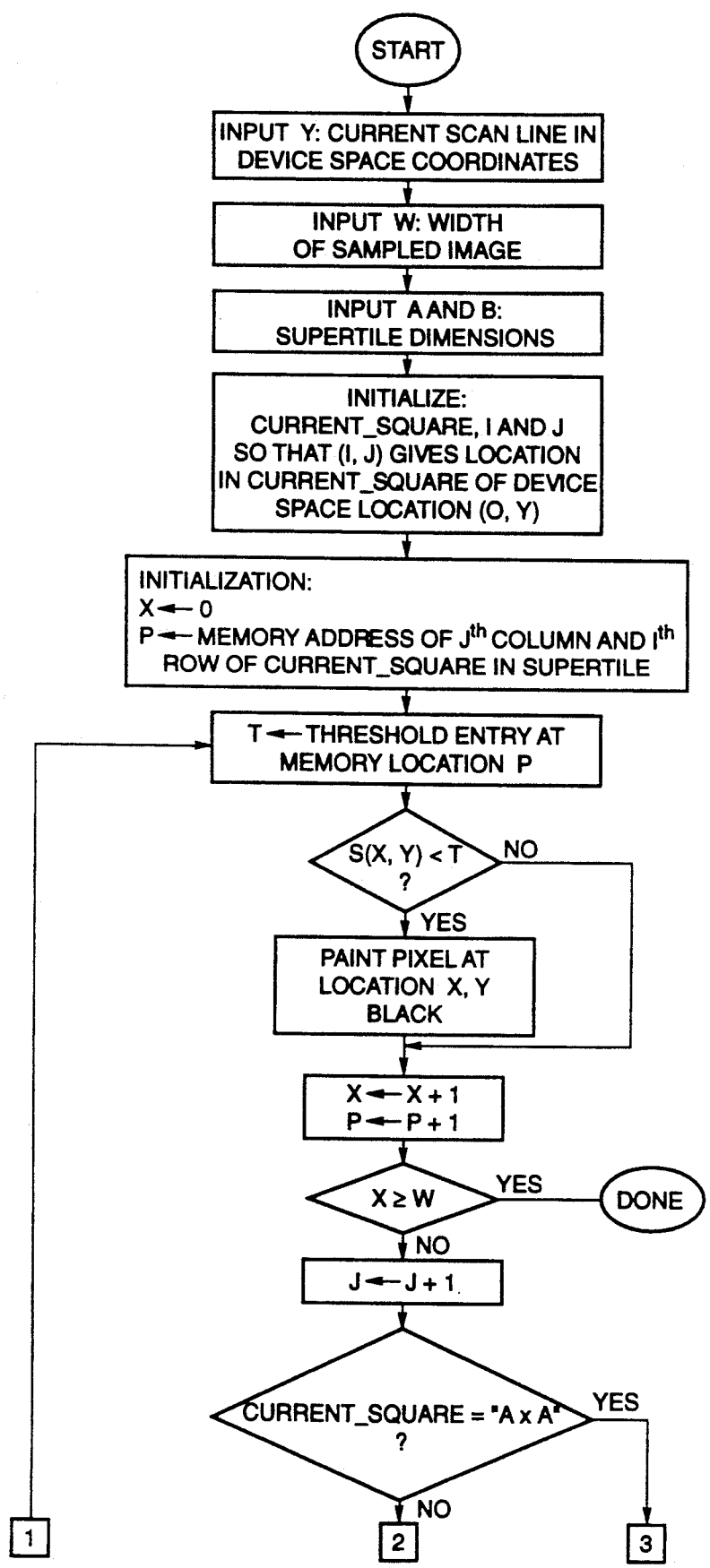
Figure 12:
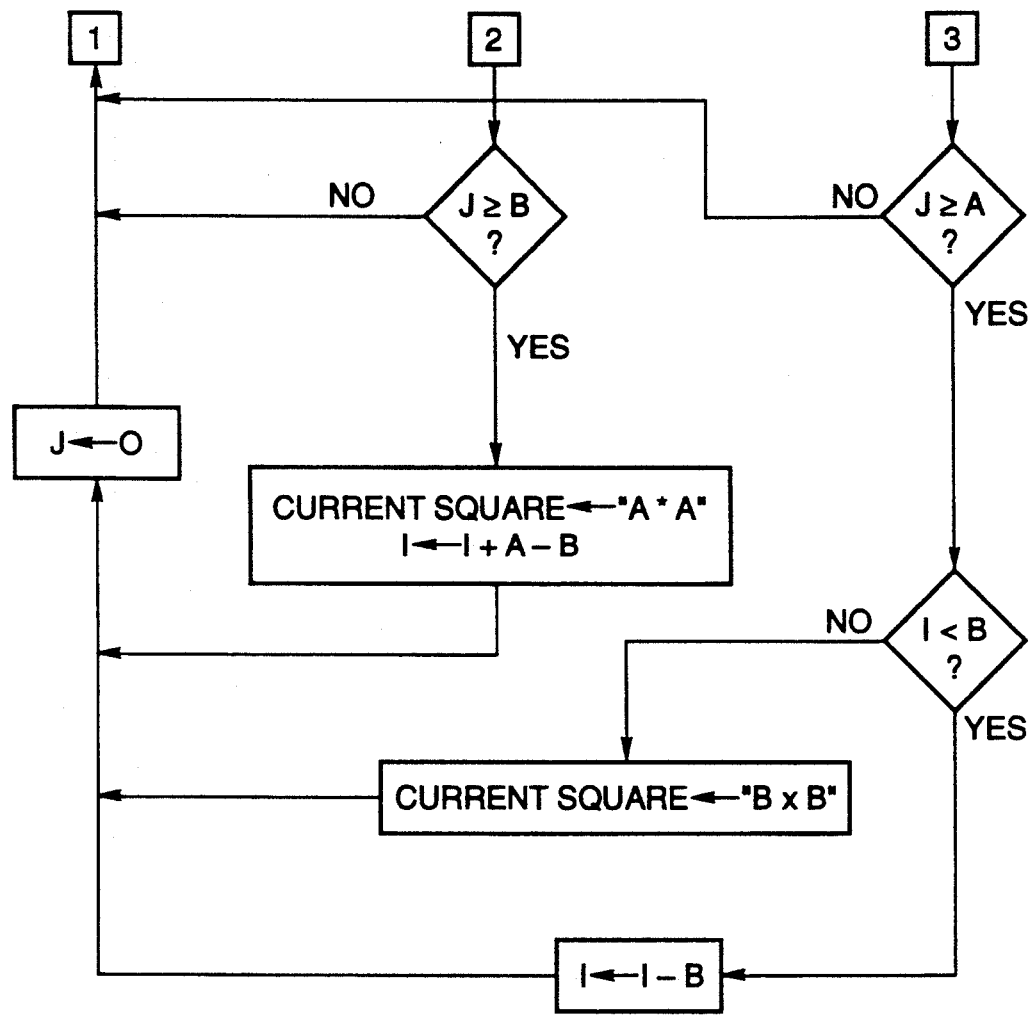

As shown in FIGS. 11-12, this example illustrates implementing a halftone level function by showing how the pixels stored in the supertile that correspond to a row of pixels in the source image could be accessed very quickly.

It was useful to access such a set of halftone level pixels since pixels in the source image were generally available row by row and pixels within one row were stored in consecutive locations in memory or were being provided in a continuous stream by a scanning device. Since speed was of great importance, especially when an image consists of millions or tens of millions of pixels, it was important that pixels be accessed in the right order from the supertile as fast as source pixels were available. It was also useful to be able to output the display image in rows that did not have to be stored but could be written directly to a raster display device. It was possible to write the display to a frame buffer, but sometimes it was advantageous to write to the printer directly.

Figure 7:
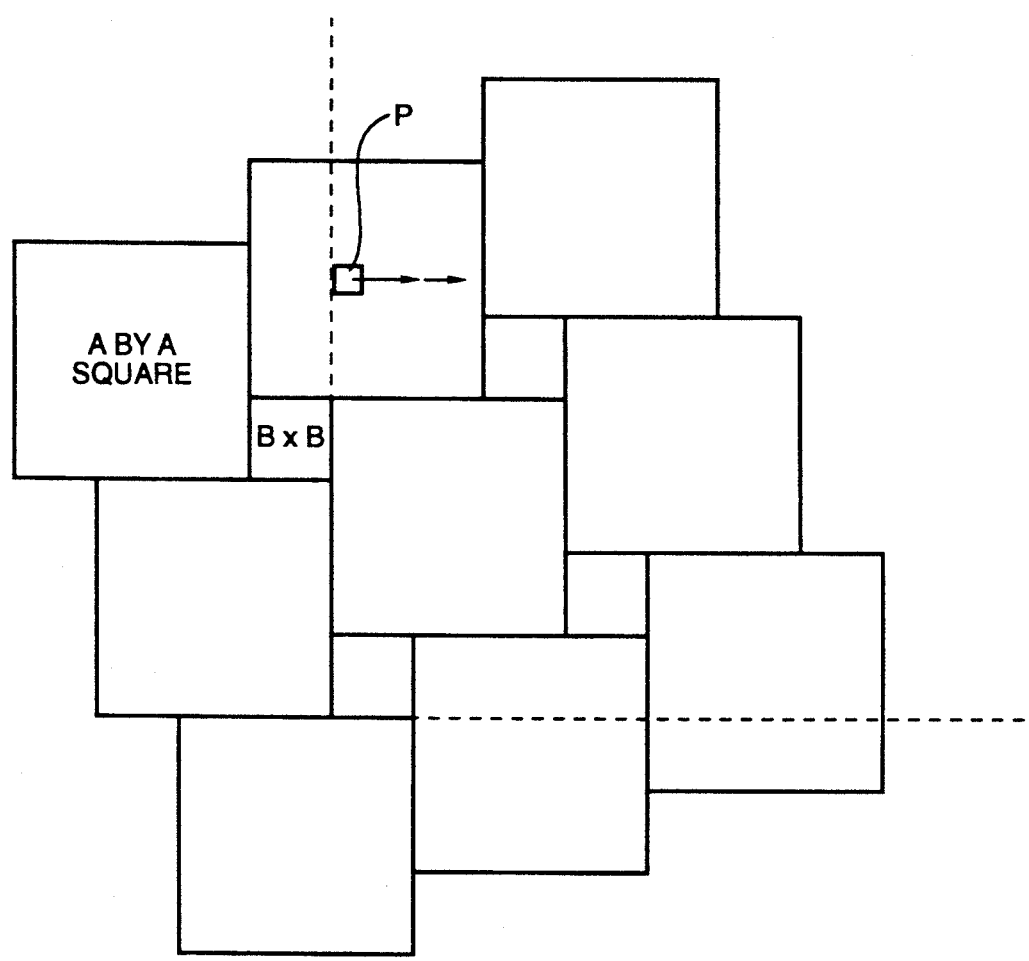
FIG. 7 illustrates a method of filling device space with Utah tiles.

The deformed supertile consisted of two squares, one A by A and the other B by B, where $A + iB = H$. Separating the Utah-shaped supertile into these two squares and tiling the plane with them gives the result shown in FIG. 7. The supertile was represented in computer memory such that each row of pixels in the A by A square occupied A consecutive memory locations and consecutive rows in the A by A square were adjacent in memory. Similarly, the B by B square was stored in consecutive memory locations. The location of each pixel in the source image was described as (X, Y), so the first pixel in the Yth row of the source pixels was represented as (O, Y). That pixel corresponds to an specific supertile pixel in either the A or B deformed square. FIG. 7 illustrates a source pixel that corresponds to the Jth pixel in the Ith row in the A by A square of the supertile, where the indices I and J start from 0 and go to $A - 1$. Point P has (I, J) coordinates (3, 4) and source image coordinates (O, Y). Scanning to the right, with increasing X, the next A-I-1 supertile pixels can simply be read from the next supertile memory location, starting at address P. At the ((A-I)th pixel a new supertile memory row begins in either the A by A square or the B by B square of the supertile. The correct new supertile memory row could readily be calculated. Assuming that A was greater than or equal to B (the opposite case was symmetric), the following table was used to calculate the transition:

| Old Square | Old Row | Test | New Square | New Row |
|---|---|---|---|---|
| A | I | I < B | B | I |
|   |   | I >= B | A | I − B |
| B | I | (None) | A | I + A − B |

Thus, starting at the end of row I of an A by A square, if I was greater or less than B the table shows which square and which row in that square to continue in. When leaving a row in the B by B square no test was required, the next row was row I + A − B of the A by A square. The value A − B could be precomputed and stored.

A simple extension of this method was used for readjusting the supertile row pointer, P, into the next appropriate supertile upon reaching the end of a supertile row, I. For each pixel scanned, while P was inside a row, P, was read and incremented, followed by a test to see if P was at the end of a row. Within a row, the next supertile memory location contains the desired level function value. When P reached the end of a row the only extra operations were, at worst, a test and an add. To minimize this extra end of row work the supertile rows were made as long as possible. To this end, the supertile was selected to take up at least half the memory available for it. If the supertile calculated using the method of this invention was less than half that size, it could be duplicated, or the method of calculating the supertile could be extended until the supertile was sufficiently large. For example, if the maximum memory available was around 200K bytes then $|H|^2$ was at least 100K and A and B were on the order of $\sqrt{100K/2}$ or about 224. Thus, the end-of-row work will be required after one out of 224 pixels on average, negligible compared to the bulk of the inter-row work.

Note that the inter-row calculation time was no greater than that required by fastest prior art method of halftoning described above. That method, which uses rectangular tiles, when implemented as a computer program requires a read from memory for the next halftone level, a check to see if the halftone level element is at the end of the rectangle, and an increment of the memory pointer.

The present invention has been described in terms of a display device that can display only two states, e.g. on and off. One skilled in the art will recognize, however, that this invention can also be used to generate displays having a range of gray values, preferably more limited than the range of source values. One advantage of using a gray scale in halftoning is that the edges of each halftone dot can be made less abrupt. One method of creating a scaled output is to use the method of the present invention as described with the additional test of evaluating the magnitude and sign of the difference between the source image value S(X, Y) and the corresponding halftone level function L(X, Y). That difference can be translated to a display gray scale including contrast by adjusting what difference is required for each display gray scale step. Colors can also be displayed, in one or more densities, according to the teachings of the present invention.

The method of this invention is fast and accurate. The examples have been described generally in the context of using a computer, but one skilled in the art will recognize that part or all of the invention could be implemented or practiced using special hardware or circuitry in place of some or all of the computer methods as described herein. One skilled in the art will recognize many variations on the present invention that fall within the claims of this invention.

What is claimed is:

1. A method of displaying on a display pixel grid a halftone image produced from a source image having source pixel gray values, said halftone image being represented by halftone cells, each containing a plurality of pixels and having dimensions and orientation designed to match a desired screen grid which is rotated to a predetermined angle with respect to said display pixel grid, said screen grid having a coordinate system which is independent of said display pixel grid, comprising:

selecting a plurality of pixels defining a supertile which includes more than one halftone cell, wherein a plurality of identical supertiles are capable of tiling the plane of said source image;

selecting reference halftone gray values for the pixels in said supertile;

comparing said source pixel gray values with corresponding reference halftone gray values for the pixels in said supertile; and selectively displaying the pixels of said halftone image based upon the outcome of the comparison.

2. The method of claim 1 wherein the supertile consists of more than one adjacent halftone cell such that each corner of the supertile meets or almost meets a corner of a halftone cell.

3. The method of claim 1 wherein the pixels defining said supertile are selected using the method of continued fractions.

4. The method of claim 1 wherein the supertile is deformed to form a Utah-shaped supertile having the same area as the original supertile, said Utah-shaped supertile generally having the shape of one or two adjacent squares.

5. The method of claim 1 wherein said supertile contains only whole pixels.

6. The method of claim 1 wherein said supertile includes halftone cells of adjacent supertiles which, in tiling the plane of said source image, align to approximate a smooth halftone screen.

* * * * *

UNITED STATES PATENT AND TRADEMARK OFFICE
CERTIFICATE OF CORRECTION

PATENT NO. : 5,235,435
DATED : August 10, 1993
INVENTOR(S) : Stephen N. Schiller It is certified that error appears in the above-indentified patent and that said Letters Patent is hereby corrected as shown below:

| | | |
|---|---|---|
| Col. 06, line 01 | delete "pixed" | insert --pixel-- |
| Col. 12, line 21 (equation line 14) | after " D " and before " E " | insert --*-- |
| Col. 15, line 52 | delete "O" | insert --0-- |
| Col. 15, line 58 | delete "O" | insert --0-- |

Signed and Sealed this

Eighteenth Day of October, 1994

Attest:

BRUCE LEHMAN

Attesting Officer    Commissioner of Patents and Trademarks